Feb. 26, 1952 — H. E. SCHLENZ — 2,586,998
APPARATUS FOR HEATING MATERIALS
Filed May 31, 1946 — 7 Sheets-Sheet 1
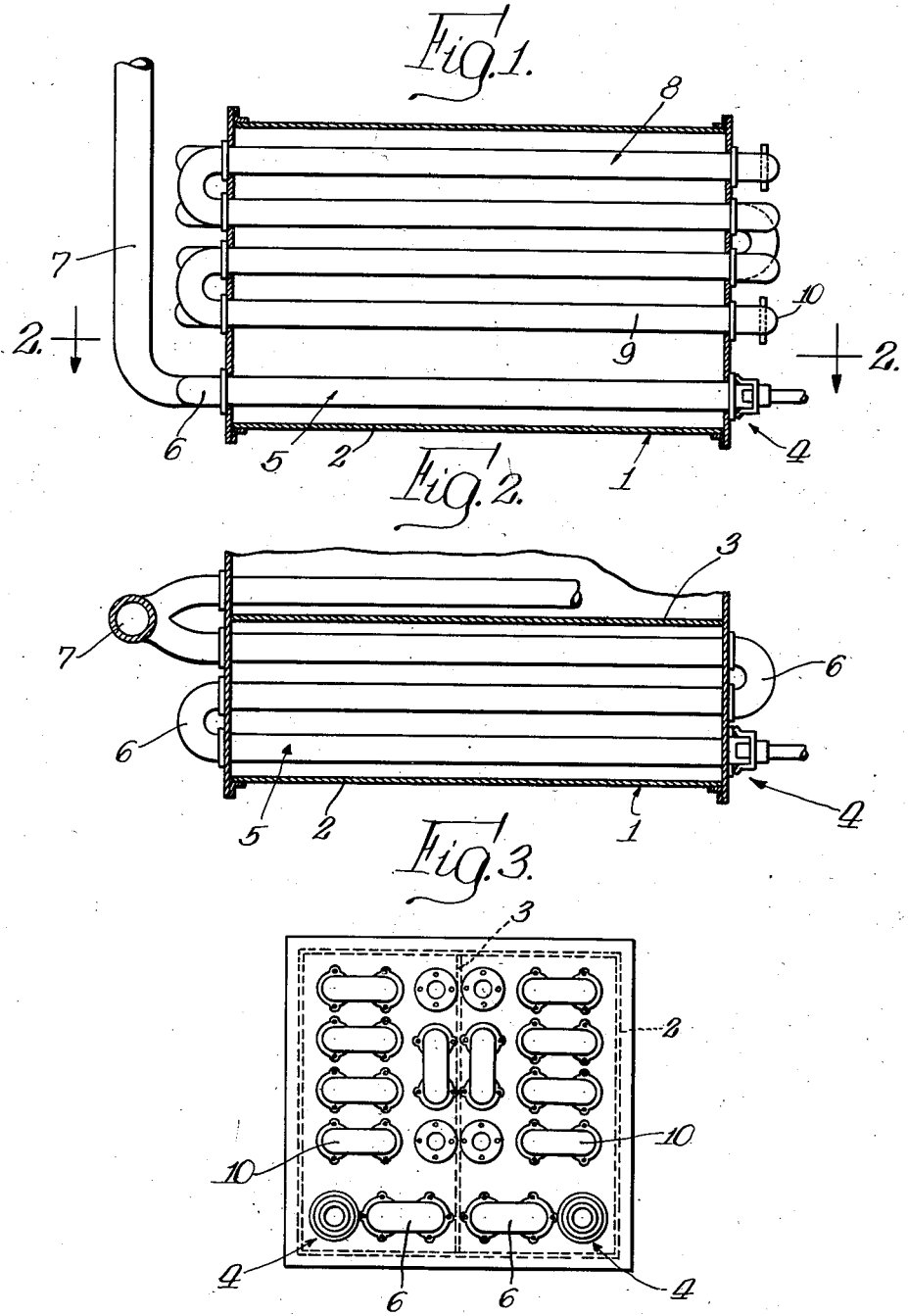
INVENTOR.
Harry E. Schlenz,
BY
Atty's

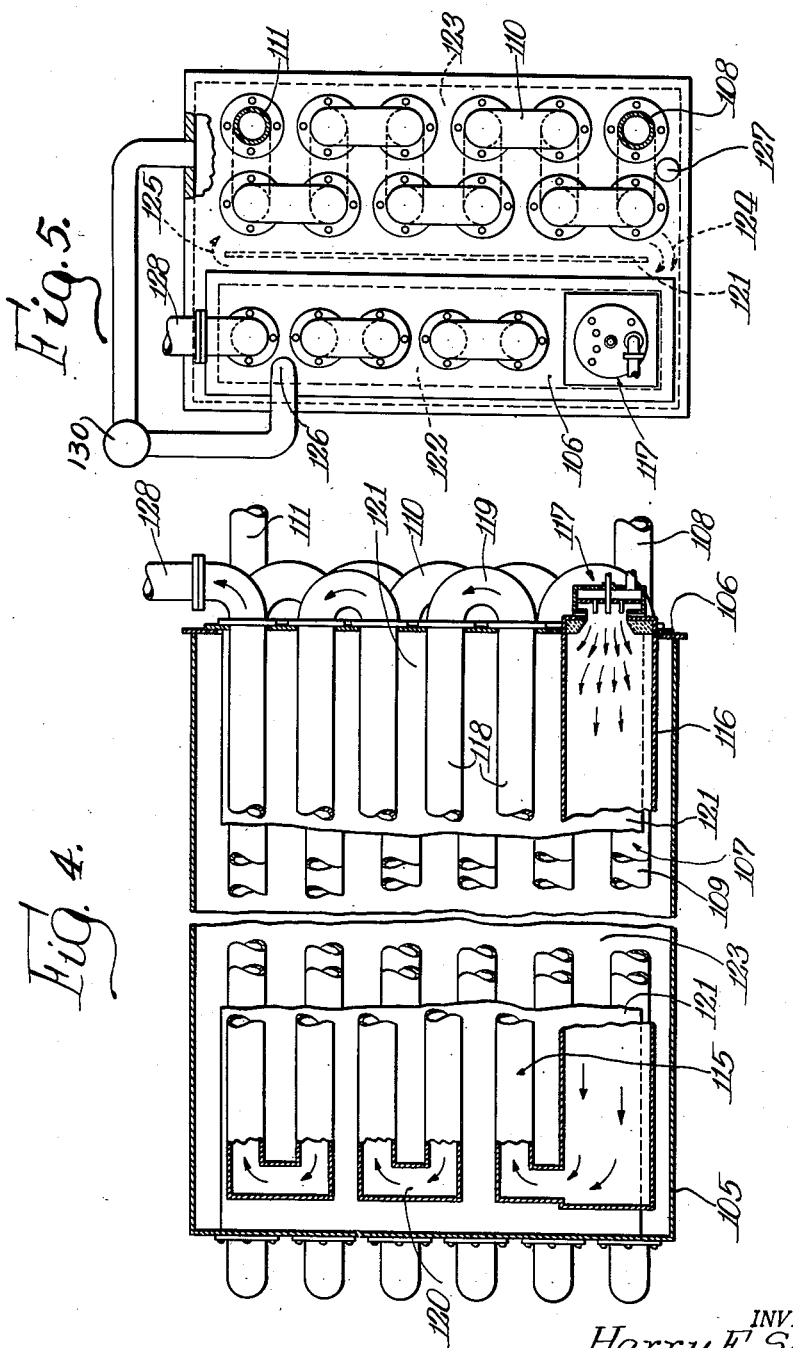

Feb. 26, 1952        H. E. SCHLENZ        2,586,998
APPARATUS FOR HEATING MATERIALS

Filed May 31, 1946                                          7 Sheets-Sheet 3

INVENTOR.
BY Harry E. Schlenz,
Attys

Feb. 26, 1952　　　　H. E. SCHLENZ　　　　2,586,998
APPARATUS FOR HEATING MATERIALS
Filed May 31, 1946　　　　　　　　　　　　7 Sheets-Sheet 4

INVENTOR.
Harry E. Schlenz,
BY
Attys

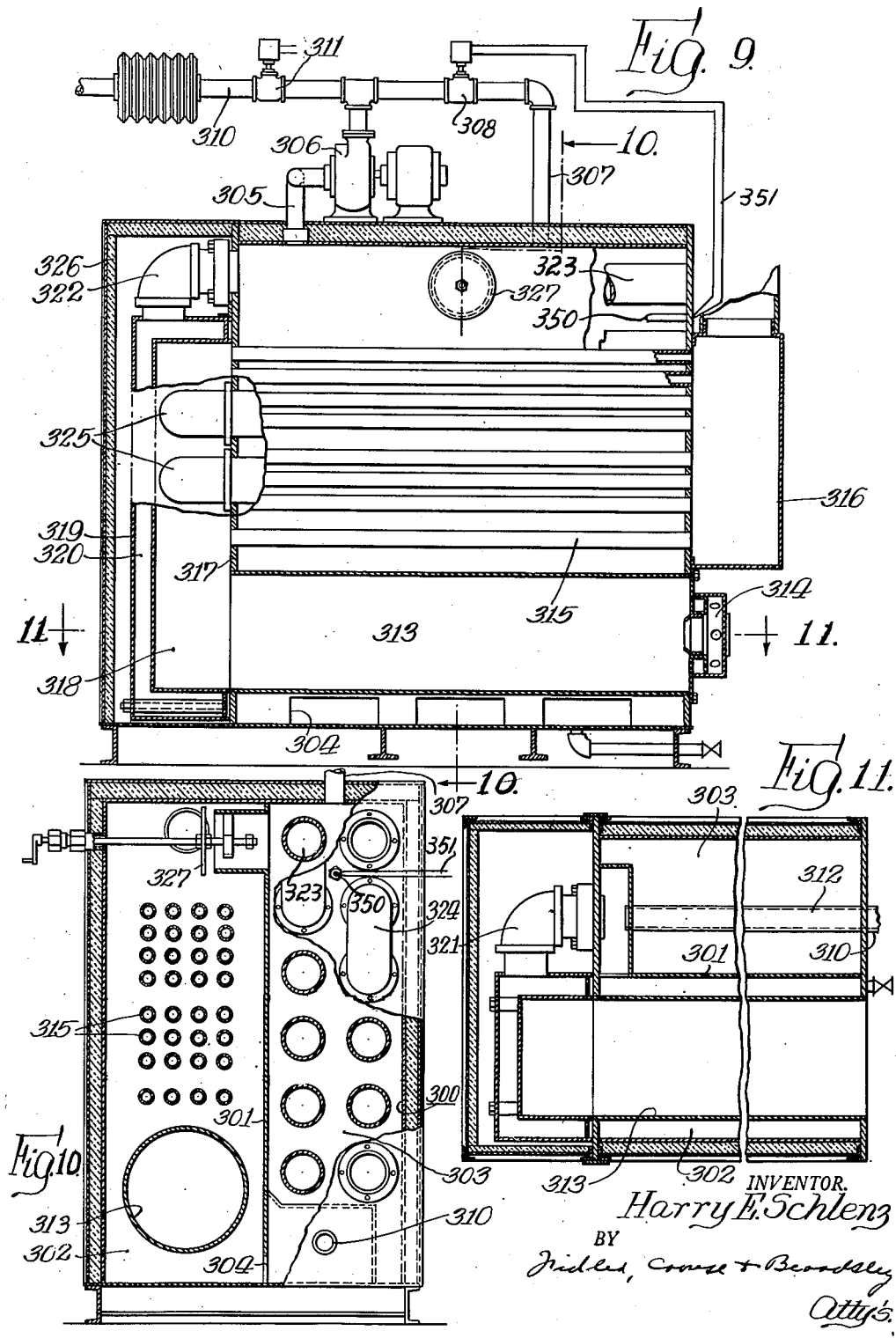

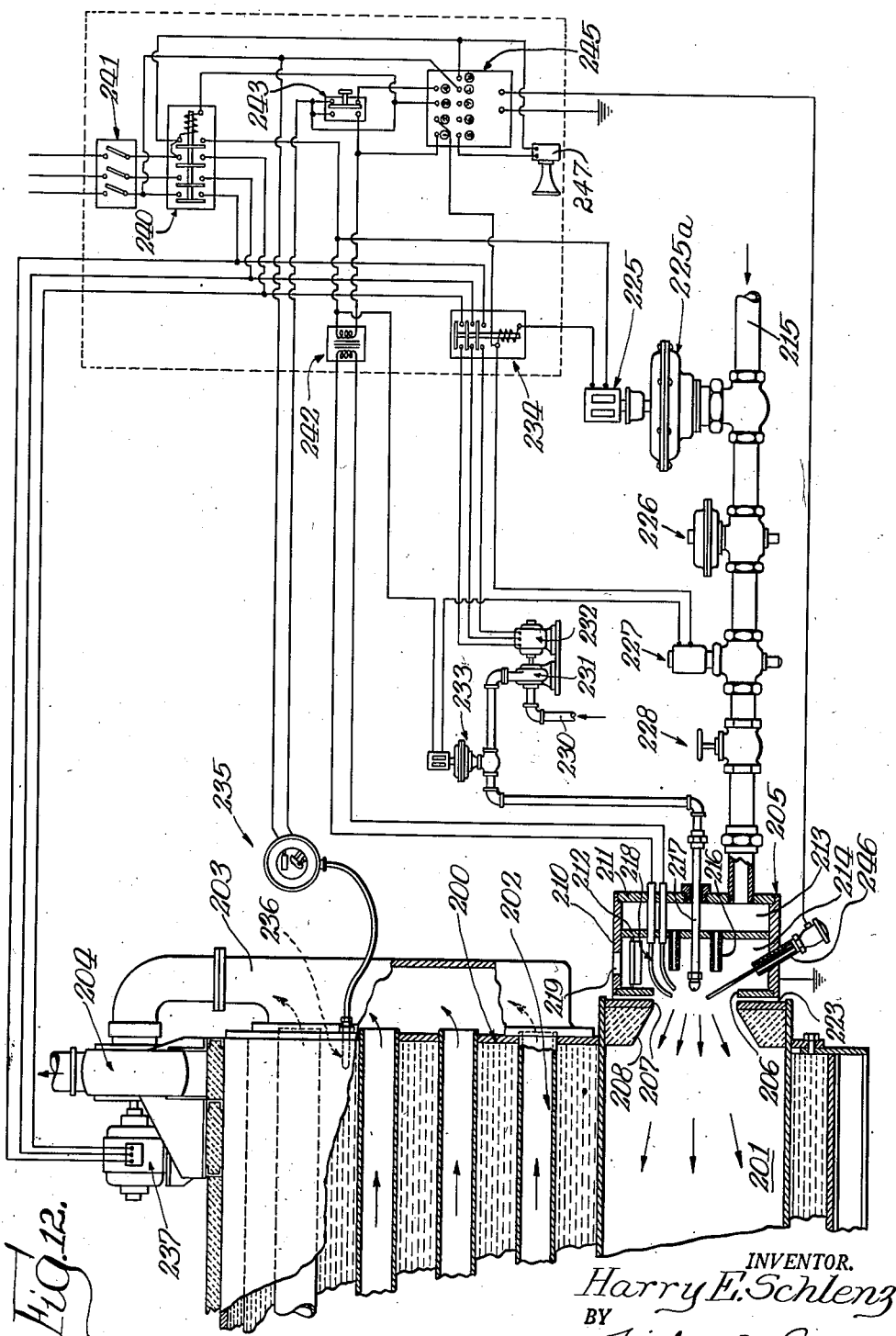

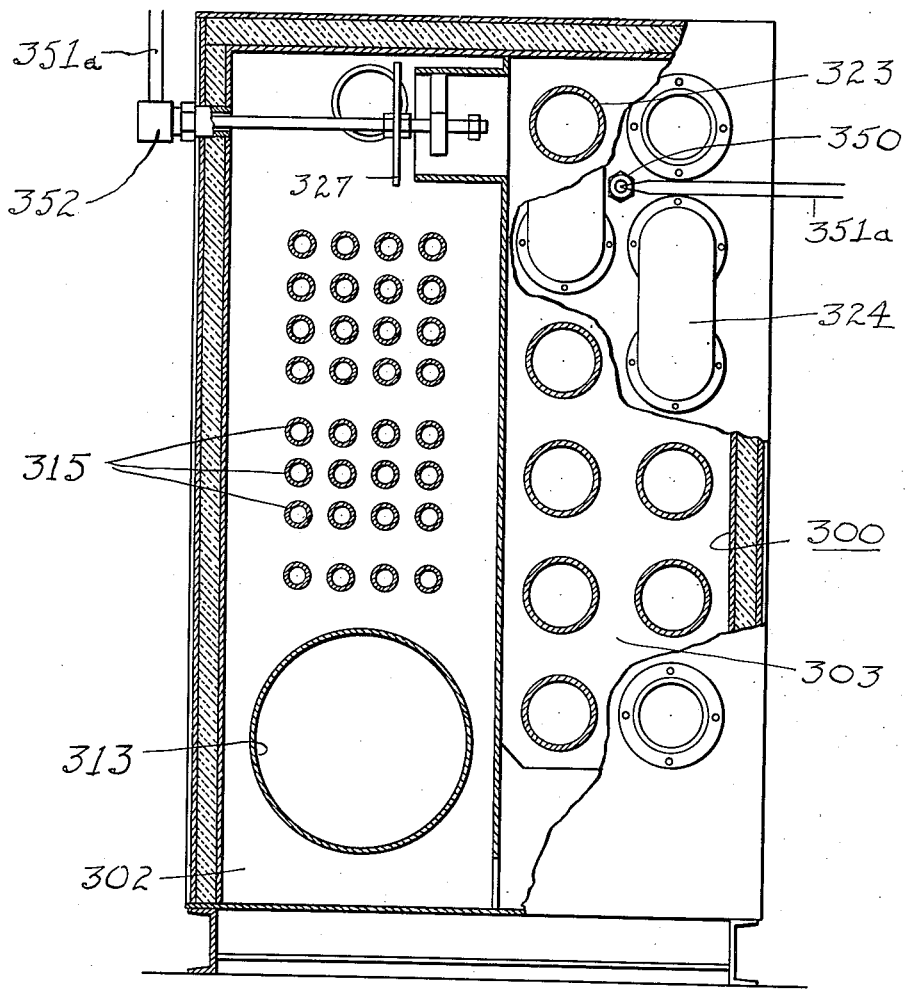

Patented Feb. 26, 1952

2,586,998

UNITED STATES PATENT OFFICE 2,586,998

APPARATUS FOR HEATING MATERIALS

Harry E. Schlenz, Glencoe, Ill., assignor to Pacific Flush Tank Company, Chicago, Ill., a corporation of Illinois Application May 31, 1946, Serial No. 673,659

15 Claims. (Cl. 122—149)

This invention relates to heaters and has to do particularly with improved apparatus for heating materials which are essentially in a liquid state such as liquids, and liquids carrying entrained or suspended solids.

It is necessary in certain processes as, for example, the digestion of sludge separated from domestic sewage or trades wastes (which for convenience are designated herein as "digestible organic wastes"), to maintain such material at an optimum temperature in order that digestion or other processes may proceed to the desired end result and at the highest efficiency. Heretofore the necessary heat has been provided by heating water in a standard gas fired water tube heater or boiler and circulating the water by means of a pump through a series of coils immersed in the material to be heated, the water so circulated giving up its heat by heat transfer to the contents of the tank. Certain materials, such as sewage sludge, when heated to any substantial temperature, tend to scorch or burn and build up on the walls of the heat transfer coil. The crust or cake thus formed tends to act as an insulation and interferes with the proper transfer of heat to the liquid to be heated. It is then necessary to de-water the tank to remove the scale or crust from the coil, thereby causing disruption of the process and requiring substantial time and expense. Furthermore, in heating certain materials, such as sludge, it is necessary to circulate water through the system at temperatures relatively lower than the temperature of the combustion gas which causes a serious condition at the boiler since the gas when burned releases moisture and sulphur compounds which tend to condense on the coils or boiler sections confining the relatively low temperature circulating water in the boiler. These condensed moisture and sulphur compounds form sulphuric acid which results in rapid deterioration of the boiler.

An object of the invention is to provide a heater for liquid materials wherein the liquid to be heated is confined and circulated through a liquid heating bath, and heating gases are confined and circulated through the bath in such manner that a highly efficient heat exchange takes place between the heating gases and the liquid to be heated and wherein there is obtained a relatively complete utilization of the heat available from the heating gases.

Another object of the present invention is to provide a heater for liquid materials wherein the deposition of boiler scale, caking of material being heated, and condensation of combustion products are minimized, thereby insuring efficient operation, long life of the apparatus, and a minimum of loss of time for cleaning, repair, or replacement of parts.

Another object of the invention is to provide a heater for liquid materials, which heater is formed with coils for conducting heating gases and liquid material to be heated through a liquid heat exchange medium, the coils being arranged to permit them to be cleaned readily with a minimum of lost operating time.

Another object of the invention is to provide an improved heater for liquid materials which is simple and rugged in construction, easy and inexpensive to manufacture and which is highly efficient in operation.

Another object of the invention is to provide a heater for liquid materials wherein a liquid heat exchange medium is confined in surrounding relation to a coil through which a heating gas or gases are circulated and is maintained in heat exchange relation with a coil through which liquid material to be heated is circulated, whereby the heat transfer between the heating gas or gases and the liquid to be heated can be closely controlled and the apparatus can be operated at an optimum temperature of the liquid to be heated and with a high degree of efficiency of the heater.

Still another object of the invention is to provide a novel and highly efficient burner suitable for numerous applications and which is capable of burning gaseous fuel, liquid fuel, or gaseous and liquid fuels simultaneously.

A further object of the invention is to provide a novel burner capable of burning gaseous fuel, liquid fuel, or both, simultaneously and wherein the supply of liquid fuel to the burner is controlled automatically in accordance with the pressure of the gaseous fuel supply, whereby upon a decrease in the availability of gaseous fuel at the burner below a predetermined minimum, liquid fuel is supplied in lieu of, or in addition to, the gaseous fuel.

A further object of the invention is to provide a heater for liquid material which heater is adapted to utilize, for other purposes than the heating of the liquid material, any heat resulting from combustion of available fuel and which may be in excess of the amount of heat required for heating the liquid material to the desired temperature and which excess heat might otherwise be wasted.

Still another object of the invention is to provide a novel and efficient heater which is excellently well adapted for heating sewage sludge or supernatant liquid withdrawn from a digester and for utilizing in the heater the gas generated by the digestion process.

Other and more specific objects of the invention are to provide a heater for liquid materials which is adapted to heat such liquid materials which are circulated at an optimum velocity through a conduit located in a liquid bath; which has a liquid bath requiring only a relatively small amount of water; which has a bath adapted to be connected to an external system whereby the bath water can be used for heating purposes in addition to the heating of the liquid circulated through the bath or can be supplied with bath liquid heated from a source of heat outside the bath; which is provided with a liquid heating tube and fire tubes which can be exposed readily from outside the water bath tank for cleaning or repair; which is compact and efficient as to floor space; which has a highly efficient arrangement of liquid tubes and fire tubes adapted to provide heat exchange therebetween by radiation, conduction and convection, thereby utilizing a high percentage of the heat developed in the fire tubes; and which provides for ventilation of the heater room or other space.

Other objects and advantages of the invention will appear from the following description taken in connection with the appended drawings in which:

Figure 1 is a vertical, sectional view showing somewhat diagrammatically a heater constructed in accordance with the invention;

Fig. 2 is a fragmentary, horizontal, sectional view taken along the line 2—2 of Fig. 1;

Fig. 3 is a front elevational view of the heater shown in Fig. 1;

Fig. 4 is a vertical, sectional view through another embodiment of the invention with certain of the parts broken away and in section;

Fig. 5 is a front elevational view of the heater of Fig. 4;

Fig. 6 is a fragmentary side elevational view, with certain of the parts broken away and in section, of a further embodiment of the invention;

Fig. 7 is a front elevational view of the heater of Fig. 6 and showing also the external circuit connected thereto; certain of the parts being broken away and in section;

Fig. 9 is a view of a vertical section through still a further embodiment of the invention;

Fig. 10 is a fragmentary front elevational view of the structure of Fig. 9, certain of the parts being broken away and in section;

Fig. 11 is a fragmentary horizontal sectional view taken along line 11—11 of Fig. 9;

Fig. 12 is a somewhat diagrammatic view showing a burner and controls therefor, associated with a heater tank, shown in part, embodying my invention; and Fig. 13 is a view similar to Fig. 10 only showing a modified arrangement for actuating the thermal control valve.

Figure 8:
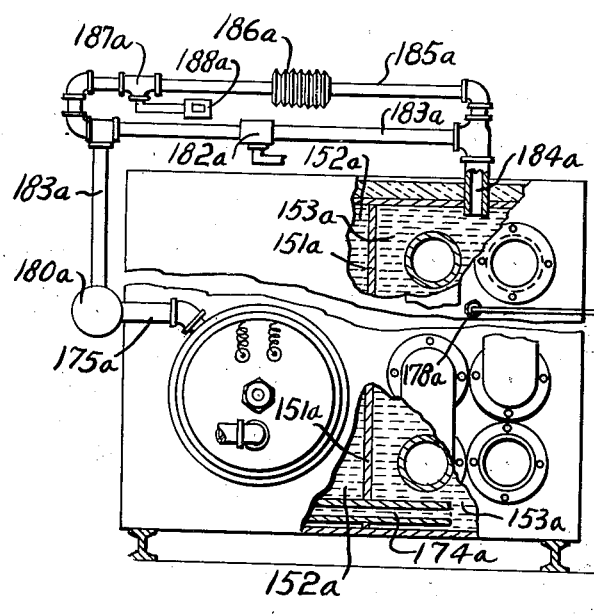
Fig. 8 is a somewhat diagrammatic, fragmentary view showing a heater in which the tank has a modified baffle arrangement for dividing the tank into two zones.

This application is a continuation-in-part of my application S. N. 567,408 filed December 9, 1944, now Patent No. 2,516,076 dated July 15, 1950.

The heater disclosed and claimed in the present application is especially well adapted for use in a system such as disclosed and claimed in my aforementioned patent, in which system sewage sludge or supernatant liquid is withdrawn from a digester, circulated through and heated by the heater and returned to the digester. The heater of the present application also is well adapted to utilize as a fuel the gas generated in the digester as disclosed in the above mentioned patent. However, the heater is not limited to use in the above manner but is well adapted for many other applications where a liquid material is to be heated and the heater may use gaseous, solid or liquid fuel produced from other sources than digesting sewage or trades wastes.

In Figs. 1, 2 and 3 there is shown somewhat diagrammatically one form of heater constructed in accordance with the invention and which is well adapted for use in a sewage treatment system as above described or for many other uses.

Referring particularly to Fig. 1, the heater 1 preferably comprises a water tank or basin 2 arranged in a plurality of sections by means of one or more intermediate walls 3. Each section may be provided with a burner indicated generally at 4 for effecting combustion of the gas fuel supplied to the burner, such as, the gas generated during the digestion process in a sewage digester.

Combustion of the gas may take place within and the hot gases therefrom may pass through a flue or fire tube coil 5 in the lower part of the tank 2 to heat water or other heat transfer liquid contained within the tank. In standard gas fired boilers used in liquid heating systems heretofore employed, considerable difficulty was experienced due to the moisture and sulphur compounds released due to the combustion of this type of gas. In the prior systems, these compounds tended to condense on the coils of the boiler sections confining the relatively low temperature water in the boiler, and the compounds formed, such as sulphuric acid, resulted in rapid deterioration of the boiler. With the present heater, the water in the tank is heated to a substantially higher temperature than the water in the standard boiler heretofore employed and no material condensation of the moisture and sulphur compounds takes place. Therefore, the coils 5 are not subjected to such rapid deterioration as the water coils or boiler sections in previously used apparatus. No appreciable amount of scale can be formed since the water which completely surrounds the flues or coils 5 is not changed so that scale forming material on the flues and the coils is avoided. If any scale formation or deposit forms on the inside of the coils 5, the construction is such as to permit them to be readily cleaned on the inside. To this end the various pipes comprising the coils 5 extend to the ends of the tank 2 and are connected externally thereof by means of return bends 6 which may be readily removed to facilitate cleaning of the coils.

The heating or liquid coil 8, through which the sludge or other liquid to be heated is passed, also has many distinct advantages not attainable in the apparatus heretofore used. In the prior apparatus the heating coils within the digestion tank carried water or material to be heated at approximately 180° F. in order to supply sufficient heat to the digestion material within the tank. This tended to cause a scorching of the sludge, or other material, and a caking on the exterior of the pipes composing the coil, which materially reduced the efficiency of the digestion section of the plant. Removal of such cake or crust required shut down of the digestion section of the plant and a constant heavy expense for labor and time.

Caking in the coils 8 to any great extent is prevented by pumping the material therethrough at a sufficiently rapid rate so that it does not become scorched or burned and thus cannot cake on the inside surface of the coil. However, the coil 8 in the present instance is so constructed that what little caking may occur can be readily removed without necessitating a shut-down in the operation of the heater for any appreciable period. Moreover, each section of the heater is provided with an independent coil, each comprising a plurality of pipes or conduit sections 9 connected externally of the tank 2 by means of return bends 10. The coil in any one section may be shut off from operation for cleaning while the coils in the remaining sections continue to operate. In larger installations, a number of units can be employed so that but a small capacity need be out of service at any one time for cleaning.

In the apparatus of the present invention both the flues and liquid coils are readily accessible for cleaning and thus permit a simple mode of maintaining the heater at its peak efficiency at all times. Caking of the sludge or other material within the coils is to a great extent prevented by the high rate of circulation of the sludge, or other material, which tends to increase the heat transfer coefficient of the heater and consequently permits a reduced coil area. The condensation of moisture and sulphur compounds resulting from combustion of the gas is reduced to a minimum since the water within the tank of the heater is maintained at a sufficiently high temperature to avoid such condensation. Moreover, the temperature in the flue and the stack is maintained above the condensation temperature of the combustion gases and also the velocity of the gases is sufficient to carry any condensation products out of the stack.

In the case of relatively small installations where it may not be feasible to provide multiple combined heater and heat exchanger sections, the cleaning of the tubes, including both the combustion tubes and the sludge or liquid heating tubes may be completed in a few hours, during which time the heating of the digester or other apparatus connected to the heater may be omitted since the loss in temperature during this short period would be so slight that it could be easily made up when the unit is returned to service.

While the heat for the water bath in the heat exchanger is herein shown as obtained from the combustion of gas generated during the digestion of sludge, such heat may be obtained in other ways. For example, where such gas is utilized in internal combustion engines, it is possible to utilize the heat from the water in the cooling jacket of the engine by circulating such water through one of the sections of the heat exchanger as the water bath, maintaining a temperature most suitable to the gas engine operation. In this case the combustion coil should either be omitted or remain idle, since the heat given up to the circulated material for heating the digester would also result in a cooling of the circulated water to serve the purpose of cooling the engine. Heat from exhaust gases of the internal combustion engine may also be recovered by passing them through the flues of an additional section of the heat exchanger herein described. It is also realized that, in the case of areas where electric power is readily available at a low rate of cost, an auxiliary heating means may be provided in the form of an electric heating unit (not shown) paralleling the combustion tubes in certain sections of the heat exchanger, to be used as a standby in the place of using other types of combustion materials in case of a failure of the gas supply. Instead of circulating combustion gases through a flue immersed in the water bath, the bath may be heated by circulating bath water from the tank through a water heater or boiler of any known construction heated by any available type of fuel.

The heater of this invention may be heated by any suitable type of burner but preferably I employ a burner such as disclosed in my copending divisional application Serial No. 58,055, filed November 3, 1948, which is capable of burning either gas or liquid fuel, such as oil, or both. This type of burner is particularly desirable for use with the heater when the heater is utilized for heating sewage sludge, wherein economy of operation can be obtained by employing the gas generated in the sewage digester as a source of heat. However, in many cases insufficient gas is generated to provide the desired heating and it is necessary to supplement the gas heating by liquid fuel heating.

In Figs. 4 and 5 there is illustrated somewhat diagrammatically a further embodiment of the invention in which the heater is particularly well adapted for utilizing the heat of the available fuel for other purposes, in addition to heating the liquid material.

Referring particularly to Fig. 4, the heater includes a tank 105, the front wall of which includes a removable panel 106. Some or all of the walls of the tank may be insulated in a manner not illustrated but which will be readily understood.

A coil 107 for circulating liquid to be heated is disposed in one portion of the tank and includes an inlet 108 extending into the tank, a plurality of generally parallel and preferably horizontal tubes 109 connected at their ends by removable return bends 110 disposed outside the tank and attached to the front and rear walls thereof respectively, and an outlet 111 connected to the coil 107 and extending through the front wall of the tank 105 at the upper portion thereof.

A heating flue or fire tube assembly 115 is disposed in the side portion of the tank 105 not occupied by the liquid coil 107 and includes an elongated generally horizontal combustion chamber or fire box 116 extending substantially throughout the length of the tank 105, and having a suitable burner 117 associated therewith. While the burner 117, including the controls therefor, may be of any suitable construction, preferably it is similar to the burner disclosed in my aforesaid copending divisional application. Connected to the fire box 116 at the end away from the burner 117 is a plurality of generally parallel horizontal flues or fire tubes 118 connected at their front ends by removable return bends 119 disposed exteriorly of the tank and supported on the removable panel 106. At their rear ends the fire tubes 118 are suitably connected by return bends 120 which are disposed entirely within the tank 105. The fire tubes 118 may be supported at their rear ends by suitable means such as a mounting bracket (not shown). The end of the fire tube coil 115 is connected to an external stack 128 and suitable exhaust means (not shown) may be provided for producing a draft. If desired, however, the burner 117 may be operated by pressure firing wherein the fuel is injected into the fire box under sufficient pressure to produce the necessary draft to support combustion, as for example by a conventional blast type of burner.

The fire tubes 118 may be cleaned readily without de-watering the tank by merely removing the external return bends 119. Since the fire box 116 and the fire tubes 118 all are secured to the removable front panel 106, all of these members can be removed from the tank 105 as a unit for cleaning the exterior of the tubes if such be desired or replacing the unit in its entirety.

Disposed within the tank 105 and interposed between the fire tubes 118 and the liquid tubes 109 is a baffle 121 which divides the tank into two different temperature zones, namely, a hot zone 122 in which the fire tube assembly 115 is located and a colder zone 123 in which the liquid coil 107 is located. The baffle 121 preferably is of an insulating type of material or is formed by two sheets of metal with an air space or insulation therebetween to reduce the direct heat transfer through the baffle. The baffle 121 preferably is spaced from the top and bottom walls from the tank in order to provide spaces 124 and 125 for the bath water to circulate between the zones 122 and 123. A bath outlet 126 is provided in the front plate 107 at the upper portion thereof for permitting hot water to be withdrawn from the tank and a return inlet 127 is provided in the front wall at the lower portion of the colder zone 123 for return of bath water into the tank. A suitable circulating system, which may include space heating radiators (not shown) or other means for utilizing the heat of the water circulated from the bath, may be disposed externally of the tank 105 and connected to the outlet 126 and the inlet 127.

In certain cases it may be desirable to increase the circulation in the bath in order to increase the heat exchange rate between the hot materials in the fire tubes and the water bath and thence to the liquid material in the tubes. This may be accomplished by providing external circulating means including a pump such as indicated diagrammatically at 130 (Fig. 5) and connected directly between the hot zone and the colder zone and supplementing the thermal circulation around the baffle, or as a substitute therefor.

There is illustrated in Figs. 6 and 7 a further form of heater constructed in accordance with the invention, which is especially well adapted for supplying heat for purposes in addition to the heating of the liquid material and including one form of external circuit for circulating liquid between a hot zone and a colder zone of the water bath.

The heater includes a tank 150 generally similar in construction to the tanks hereinbefore described and having a partition or baffle 151 dividing the interior of the tank into a hot zone 152 and a colder zone 153. Communication between the hot zone 152 and the colder zone 153 is provided at the top and bottom of the tank 150 by openings 159 and 159a respectively, which are formed by spacing the baffle 151 from the top and bottom walls of the tank or by providing suitable openings in the baffle. A liquid coil 154 is provided which includes an inlet 155 and an outlet 158 and a plurality of pipes 156 extending through the colder zone and connected at their ends by removable return bends 157 disposed externally of the tank.

A fire tube assembly 160 is disposed in the hot zone 152 and includes a combustion chamber or fire box 161 extending into the tank 150 through a removable front panel 162 and substantially throughout the length of the tank 150. Extending upwardly from the rear of the fire box 161 is a vertical header 163 to which is connected a plurality of generally parallel, horizontal flues 164 which extend through the front plate 162 and communicate with a removable breeching 165 which constitutes a vertical header and is connected to an exhaust stack 166.

A burner 170 of suitable construction may be provided at the forward end of the fire box 161. The bath liquid is heated in the hot zone by the fire box 161 and fire tubes 164 and at least a portion thereof is circulated by convection through the opening 159 into the colder zone 153, where it flows downwardly past the liquid tubes 156 to which it gives up its heat. The cooler liquid flows to the bottom of the colder zone 153 from whence it flows through the opening 159a back to the hot zone. A portion of the bath liquid may be circulated from the colder zone 153 past the fire box 161 and externally of the tank 150 by a circuit which includes means for confining the liquid thus circulated in such manner as to cause it to flow positively in intimate contact with the exterior of the fire box.

For this purpose the fire box 161 is of two-walled construction and is provided with an interior wall 171 defining the fire box proper or combustion chamber and an outer wall or jacket 172 entirely surrounding and spaced from the inner wall 171 and providing a generally annular space 173 through which bath liquid is circulated. An intake pipe 174 extends from the bottom portion of the colder zone 153 into the hot zone 152 and is connected to the space 173 at the rearward portion of the fire box 161. An outlet pipe 175 extends from the space 173, preferably at the forward end of the fire box which projects out of the tank 150, and is connected to an external circuit including a pump 180 driven by a motor 181, a thermostatically controlled valve 182 and a pipe 183 and an inlet 184 leading into the cold zone 153 at the forward portion of the tank 150. Thus bath liquid can be drawn from the colder zone 153 and circulated around the fire box 172 and through the external system and back to the top of the colder zone 153. Since the bath liquid is confined in the annular space 173 surrounding the fire box 172 it becomes heated to a greater degree than the liquid contained in the remainder of the hot zone 152 and can be utilized for purposes which require substantially higher temperature than required to heat the liquid tubes 156 in the colder zone. However, the bath liquid in the space 173 is prevented from being heated to an excessively high temperature since it gives up heat to the surrounding liquid at the surface of the jacket 172. The rate of circulation to obtain the desired temperature of the liquid circulated through the tubes 156 may be regulated by the valve 182 which preferably is controlled by the thermostat bulb 178 suitably located, preferably in the bath liquid.

Any required portion of the liquid circulated in the external circuit may be allowed to pass through a circuit including a pipe 185, one or more radiators 186, or other devices adapted to utilize any heat not required for heating the liquid circulated through the tubes 156. The flow of liquid in the external circuit is regulated by a three-way valve 187 which may be controlled by a thermostat or thermostats 188 located in the space or spaces to be heated.

The arrangement illustrated in Figs. 6 and 7 may be modified slightly as illustrated somewhat diagrammatically in Fig. 8, to which reference now is made. The liquid tank may be provided with a baffle 151a which extends from the top wall to the floor of the tank and completely divides the bath into a hotter zone 152a and a colder zone 153a. The only interchange of liquid from the hotter zone 152a to the colder zone 153a is provided by a circulation pump 180a similar to the pump 180 above described, taking the liquid from the hotter zone 152a through a pipe 175a and discharging the liquid back into the colder section 153a through a pipe 183a and an inlet 184a.

A thermostatic bulb 178a similar to the bulb 178 and located in the colder zone 153a actuates a valve 182a similar to the valve 182 to control the transfer of liquid from the hotter zone 152a to the colder zone 153a to provide the amount of heated liquid required to maintain a desired temperature in the colder zone 153a. Colder return liquid may be conveyed by a pipe 174a, or opening, extending through the baffle 151a adjacent the bottom thereof to a space (not shown) similar to the space 173 of Fig. 7.

Building or other space heating may be obtained by circulating heated liquid through a heating circuit 185a generally similar to the circuit 185, and having a space heater 186a, the circulation being under control of a thermostatically actuated valve 187a actuated by a thermostat 188a in a manner generally similar to that described above.

The arrangements in which means are provided for forced circulation of heated liquid between the hotter zone and the colder zone not only insure very positive control of the temperature in the portion of the water bath in which the tubes carrying material to be heated are located but also make it possible to increase the velocity of the liquid in that portion of the bath, thereby increasing the heat exchange rate of the unit.

Control of the rate of thermal circulation between the two zones of the water bath may also be obtained without the use of an external pumping means such as above described. The two zones are connected by spacing the baffle from the top and bottom walls of the tank or by forming the baffle with openings adjacent the top and bottom and the spaces or openings are closed and opened by a damper controlled by a thermostatically actuated bulb in a manner hereafter explained. With such an arrangement, when thermal circulation is desired in order to pass heated liquid from the hotter zone to the colder zone, the thermostatically controlled bulb automatically opens the damper to allow transfer of the heated liquid and when the desired temperature is attained in the colder zone, automatically closes the damper, thereby obtaining results similar to those obtained by controlling the flow of liquid through an external pump circuit.

The fire box and surrounding water jacket may be extended through the rear wall of the tank in a manner similar to that in which the flues illustrated in Figs. 6 and 7 extend through the front wall, as illustrated in Figs. 9 to 11 to which reference now is made. The vertical flue header or manifold thus may be located removably on the outside of the tank in a manner similar to the arrangement of the breeching on the front of the tank. The external flue is of double wall construction with the space between such walls being connected by watertight fittings to the interior of the water bath chamber. Water for building or other space heating is heated in the hot zone of the water bath and passed through the space surrounding the external flue, whereby the water is heated to a relatively high temperature for effective use in radiators or other heating devices. In this arrangement, the fire box and flues are readily accessible for cleaning upon removal of the double wall header or manifold and the breeching at the front of the unit, and it is, therefore, unnecessary to provide a removable plate at the front of the unit.

The tank 300 is divided by a vertically-extending baffle 301 into a hot zone 302 and a colder zone 303, communication between the colder zone and the hot zone being provided at the bottom of the tank by an opening 304. The zones are also connected through a circuit including a pipe 305 leading from the top of the hot zone, a pump 306 and a return pipe 307 leading into the top of the colder zone and having a valve 308 controlled thermostatically in accordance with the temperature in the colder zone by a thermostatic bulb 350 located in the colder zone 303 and connected as by electrical conductors 351 to the valve 308. A building heating circuit 310 leads from the first circuit and is connected to a return 312 leading into the bottom of the tank, this latter circuit being controlled by a thermostatically-operated valve 311.

A fire box 313 extends through the tank and has associated therewith a burner 314. Disposed above the fire box is a plurality of parallel fire tubes or flues 315 which extend entirely through the tank and are connected at their front ends by a manifold defined by a breeching 316 removably secured on the front wall of the tank. At their rear ends, the fire tubes extend through the rear wall 317 and are connected by a vertical flue or manifold 318 defined by a rear flue header or manifold member 319 located removably on the outside of the rear wall of the tank. The member 319 is of double wall construction with the space 320 therebetween being connected by water-tight fittings 321 and 322 to the interior of the water chamber at the bottom and top of the hot zone.

A liquid coil is disposed in the colder zone 303 and includes pipes 323 connected at their ends by return bends 324 and 325 disposed exteriorly of the tank at the front and rear thereof respectively. An insulating cover 326 may be provided which encloses the double-walled member 319 and the return bends 325.

A manually controlled valve 327 may be provided for opening communication through the partition 301 adjacent the top thereof, but this is not necessary in many cases.

As previously stated, control of the rate of circulation between the two zones of the water bath may be obtained without the use of an external pumping means, but by a damper controlled by a thermostatically actuated bulb. One example of a heater in which control of the rate of circulation is thus obtained is illustrated in Fig. 13, in which the heater is similar in all respects to the heater illustrated in Figs. 9 to 11 inclusive and above described, except that the external connection between the two zones is omitted and thermally actuated means are provided for controlling the damper 327. In this construction the thermostatic bulb 350 is suitably connected as by electrical connections 351a to an actuating member such as a solenoid 352 for actuating the valve 327. The bulb 350 automatically opens the damper 327 to allow transfer of heated liquid and when the desired temperature is obtained in the colder zone 303 automatically closes the damper 327.

There is illustrated in Fig. 12 a novel burner, including a control arrangement therefor, which burner is capable of burning either gaseous fuel, or liquid fuel, or both simultaneously. The burner has particular advantages for use with systems wherein the supply of gas may fluctuate and may not be sufficient at times to provide the necessary heat. For example, in a system for heating sludge, wherein the gas generated in the digester is utilized for heating purposes, the gas thus generated may not be sufficient and it may be desirable to utilize an additional source of fuel in order to maintain the continuity of the digesting process. For example, when undue colder weather is encountered there may not be sufficient gas to maintain the digester temperature. With a drop in the digester temperature, the rate of gas production drops, further reducing the gas available for heating. If this self-perpetuating cycle continues, the lowered tank temperature will cause such a drop in the digester rate that the process may be almost completely halted. In cases such as this, it is necessary to supply heat from an auxiliary fuel source. The burner is also highly suitable for installations where the gas supply may be interrupted and it is desired to have a standby source of fuel in order to maintain the heating operation until the gas supply can be re-established. On the other hand it may be desirable for reasons of economy to utilize oil as the primary fuel and to connect the burner to a source of gas supply so that in the event of the temporary exhaustion of the oil supply the burner may continue in operation by burning gas until the supply of oil has been re-established.

The burner embodying the present invention may be employed in any of the forms of heater illustrated herein and for the purpose of illustration there is shown in Fig. 12 a tank 200 generally similar to the tank 161 shown in Fig. 6, and having a fire box 201 and fire tube assembly 202 connected thereto in a manner generally similar to the corresponding elements of Fig. 6, the bath water circulating system being omitted, however. The fire tube assembly 202 is connected to an outlet 203 having an exhaust fan 204 for creating a draft in the usual manner.

The burner includes a casing 205 which preferably is of generally cylindrical form and preferably is disposed outside of the combustion chamber 201. The casing 205 is provided with an outlet opening 206 which registers with an opening 207 leading into the combustion chamber 201. Surrounding the opening 207, and disposed inside of the combustion chamber 201 is a fire brick tuyère 208 of generally annular shape and having a flared passage leading into the combustion chamber.

The casing 205 includes a side wall 210, an end wall 211 and a partition 212, all defining an outer or manifold chamber 213 and an inner or ignition chamber 214 in which the fuel is ignited and in which combustion also may take place. A gas inlet pipe 215 leads into the manifold chamber 213 and a plurality of nozzles or burner heads 216 communicating with the manifold chamber 213 are mounted in the partition 212 and terminate in the ignition chamber 214. A liquid fuel nozzle 217 extends through the front wall 211 and partition 212 and terminates in the ignition chamber 214. Preferably the gas nozzles 216 are arranged in distributed relation, as in a circle, and the liquid fuel nozzle 217 is disposed centrally of the arrangement of gas nozzles 216.

An ignition device 218 of any conventional form is mounted and preferably consists of the usual spark gap electrodes which are disposed in position to ignite the fuel ejected from either the gas nozzles 216 or the liquid fuel nozzle 217.

A primary air inlet 219 is provided in the side wall of the burner casing 205, preferably at the upper portion thereof, and the air intake through the inlet is controlled by an adjustable air valve of suitable construction. Preferably the air valve includes a shutter or deflector (not shown) pivotly mounted in the casing 205 and having an adjusting stud (not shown) connected thereto and extending through the side wall 210 whereby the free end of the shutter can be moved toward or away from the opening 219 to control the sides of the passage defined between the shutter and the adjacent portion of the side wall. Secondary air is introduced into the combustion chamber preferably by so mounting the casing 205 relative to the combustion chamber that a space 223 is provided which serves as a secondary inlet of generally annular form.

The operation of the burner may be controlled by a suitable combination of standard electrical and pressure control devices. In a preferred mode of operation of the burner, gas is supplied as the primary fuel and fuel oil is supplied as the auxiliary or supplemental fuel. When the supply of gas is sufficient, the pressure in the gas supply line permits the gas to be supplied to the gas nozzles and no oil is normally supplied to the oil nozzle. However, when the supply of gas drops below the minimum required for producing the desired heat, control means responsive to the pressure of the gas in the gas supply line is effective to supply oil to the liquid fuel nozzle. The control arrangement is such that when the gas pressure falls to below a minimum pressure and it is necessary to supply oil, the gas is cut off and only oil is supplied to the burner nozzle. However, if desired the control means for the oil supply may be actuated to supply oil simultaneously with the gas when the pressure of the latter falls below a certain value, or when the heating demand is greater than the supply of gas alone will provide.

A control system is controlled by thermostatic means which causes the burner to operate at all times when heat is necessary in the liquid bath. Moreover, safety devices are provided of a standard type which close off all fuel supply in the event the system is calling for heat and the flame does not burn or cannot be ignited automatically by the system.

One suitable arrangement of control device for effecting the foregoing operation of the burner is illustrated somewhat diagrammatically in Fig. 12. The gas supply line 215, which is connected to a suitable source (not shown) of gas supply, includes a switch 225 controlled by the pressure of the gas supply by a diaphragm pressure device 225a, a pressure regulator 226 for maintaining a uniform gas pressure at the gas nozzles, an electrically operated gas control valve 227 and a manually operated gas control valve 228.

The oil supply line 230 includes an oil pump 231 driven by an electric motor 232 and a pressure switch 233 controlled by the pressure of the oil in the discharge line at 233. The oil pump motor 232 is controlled by a relay 234 which in turn is controlled by the pressure switch 225 so that when the gas pressure in the line 215 falls below a predetermined minimum value the motor 232 is energized to drive the oil pump 231. The pressure switch 233 is connected to the gas control valve 227 whereby when the pressure in the oil line at 233 reaches a predetermined minimum value the valve 227 is closed to shut off the supply of gas.

A switch 235 is provided for controlling the gas control valve 227 and the relay 234 and is actuated by a thermostatic bulb 236 disposed in the liquid bath and responsive to the temperature thereof to actuate the switch 235.

The suction fan 204 is driven by a motor 237 which is controlled by a starting relay 240 connected through a main switch 241 to a suitable power supply.

The spark gap 218 is connected to a spark coil 242 which is controlled by the starting relay 240 during normal operation.

The system is started by closing the main switch 241. If the system is calling for heat, the switch 235 is closed by the thermostat 236 and energizes the coil of the starting relay 240 to close the latter. The fan motor 237 is thereby energized to drive the exhaust fan 204. At the same time the ignition coil 242 is energized to provide a spark at the spark gap 218 for igniting the fuel. The ignition coil 242 may be energized for a predetermined period, for example, 25 seconds, during the starting of the burner or it may be energized continuously so long as the system is in operation. This may be accomplished in any well known manner.

If the pressure in the gas supply line 215 is sufficient, the pressure switch 225 is actuated to cause the electrically operated gas valve 227 to open and permit gas to pass into the manifold chamber 213 and thence through the nozzles 216 into the ignition chamber 214 where the gas is ignited by the spark gap 215. The pressure regulator 226 insures that the gas is supplied at uniform minimum pressure to the manifold chamber 213.

If the pressure in the gas line 215 is insufficient to support proper combustion or to provide the sufficient combustion to meet the desired heat requirements, the pressure actuated switch 225 is operated to close the relay 234 and energize the oil pump motor 232. When a predetermined pressure, for example, around 90 lbs., is developed in the oil supply line discharge at 233 the pressure actuated switch 233 opens the circuit through the electrically operated gas valve 227 which causes the valve to close and shut off the supply of gas to the manifold chamber 213. The burner then continues to operate with the oil being supplied by the oil line 230 to the oil nozzle 212.

When the quantity of gas available increases to the extent that a predetermination minimum pressure is developed in the supply line 215, the pressure actuated switch 225 is operated to open the relay 234 and de-energize the oil pump motor 232. As soon as the oil pressure falls below a predetermined value, for example, around 70 lbs., the pressure actuated switch 233 closes and causes the electrically operated gas valve 227 to open and permit gas to flow to the manifold chamber 213 in the manner above described.

If the heat requirements of the bath are satisfied at any time the thermostatically controlled switch 235 is opened, thereby opening the circuit through the valve 227 causing it to close and cut off the gas supply. At the same time the circuit through the switch 225 is opened so that if the relay 234 happens to be closed it will be opened to de-energize the motor 232, or if it is opened, it cannot be closed to energize the oil pump motor 232. If, when the switch 235 is opened, the valve 227 happens to be closed, it will remain closed. The opening of the switch 235 also causes the starting relay 240 to open and thereby stop the exhaust fan motor 237 and de-energize the ignition coil 242.

If, when the main switch 241 is closed to start the burner, the heat requirements of the system are satisfied, the system will be placed in condition to operate but will await the heat demand and will supply fuel and ignite the flame in accordance with the demands indicated by the thermostat in the water bath.

Preferably, suitable safety control means are provided for insuring that the fuel supply will be cut off at any time if the flame should be extinguished and cannot immediately be re-established by the system. Such a device is indicated diagrammatically at 245 and may include any suitable type of safety control device for performing the functions herein described, such as the "Flame-Otrol" manufactured by the Wheelco Instruments Company of Chicago, Illinois.

The safety control device 245 is connected to a flame rod or electrode 246 projecting through the wall of the casing 205 and into position to be disposed within the flames from one of the gas nozzles 216 and from the liquid fuel nozzle 217. The flame rod 246 is suitably connected in a known manner to the safety control device 245 and operates upon the well known electrical conductivity of the flame principle to permit the various control circuits above described to be completed so long as a flame is projected from either of the nozzles. However, in the event that the unit should be calling for heat and no flame exists, the control device 245 is actuated to close both the gas and oil fuel supply lines, but allows the exhaust fan 204 to continue operating to purge the system of gas so long as the unit requires heat. If desired an alarm horn 247 may be provided which also is actuated by the safety device 245 to sound an alarm when the above conditions exist.

The safety device 245 preferably includes means for automatically re-cycling the system prior to sounding the alarm horn 247 in an attempt to re-establish the flame. This is effected by the safety device 245 which opens the gas line or oil line (depending upon whether or not gas pressure in the gas line 215 is sufficient), energizing the ignition coil 242. If the flame cannot be re-established in this manner, the alarm horn 247 is sounded. A manually operated push button switch 243 is provided which is connected to the various controls above described in such manner that the system can be re-cycled to re-establish the flame after the system has been de-activated by the operation of the safety device 245, and the system does not succeed in automatically re-establishing the flame. However, if upon actuation of the push button switch 245 the flame cannot be re-established, the safety device 245 will cause the entire system to be de-activated as soon as the push button is released, and to remain so until the defect in the system which caused extinguishment of the flame can be corrected.

It will be seen from the foregoing that the present invention provides a highly efficient heater having many advantages. The arrangement of liquid coils is such that the liquid to be heated can be circulated through the coils at a velocity, which is based upon a circulation rate which is both economical as to pumpage cost and beneficial to the process (as for example, the digester circulation where the heater is used in a sewage digestion system). This velocity preferably is sufficient to provide a maximum rate of transfer of heat to the liquid to be heated. Optimum heat transfer rates, when sludge has been circulated through the heater, have been obtained by circulating the sludge at from 1.5 to 5 feet per second. The liquid to be heated traverses a relatively long path through the water bath and thus is subjected to the heat of the bath for a relatively long period which permits the heating of the liquid to the desired temperature without necessitating excessive temperatures in the water bath. Since the liquid tubes are not in direct contact with the hot gases the scorching or caking of the contents of the liquid tubes is prevented, even though the temperature of the hot gases is such that the scorching or caking would take place were it not for the interposed liquid of the water bath. Moreover, the rapid velocity of flow of the liquid to be heated serves to flush or scour the liquid tubes and thus inhibit the caking of the material being circulated through these tubes.

The liquid tubes are so arranged in the several different embodiments as to permit convenient cleaning or replacement of the tubes without the necessity for completely disassembling the unit and with the minimum of lost operating time. In those cases where the return bends are disposed exteriorly of the tank, the former can be readily removed to permit access to the interior of the corresponding tubes or complete removal of such tubes. Where the return bends are disposed wholly within the tank, the entire assembly can be quickly removed to permit cleaning or replacement of the liquid tubes.

The various arrangements of fire box and fire tube assemblies permit efficient and complete utilization of the heat produced by the available fuel under various conditions of use and the heater therefore is capable of many and varied applications. The long path provided by the serpentine type of fire tubes permits complete combustion and full utilization of a high percentage of the heat available even where the gases are passed through the fire tubes at relatively high velocity. On the other hand where conditions are such that the gases pass through the fire tubes at lower velocities the parallel arrangement of fire tubes can be employed which minimizes the loss of head in the fire tubes. The several fire box and fire tube assemblies permit use of the heater in applications where natural draft, suction induced draft, or pressure firing is employed, whichever may be best suited to the particular application. Owing to the fact that the fire tubes are in contact with the bath water and not with the pipes containing the material to be heated the combustion gases in the fire tubes are not cooled to such an extent as to cause substantial condensation therein with the accompanying deleterious deposition of moisture and sulphur compounds within the fire tubes. Moreover, the fire tubes are readily accessible for cleaning and thus any deposits can be periodically removed, thereby prolonging the life of the tubes and maintaining a high efficiency of the fire tube system.

The liquid bath provides a simple but efficient heat transfer arrangement by which in several of the embodiments the heat from the fire tubes is conducted through the liquid of the bath by conduction outwardly from the fire tubes to the liquid tubes and also by thermal circulation of the bath liquid. In other embodiments thermal circulation or forced circulation is employed and provides efficient utilization of the heat generated. Since the heat exchange liquid is maintained in a closed system and need not be changed there is a minimum of scale deposited on the surface of the fire tubes and liquid tubes and thus a high efficiency is maintained and the necessity for shutting down the system to clean scale from the tubes is reduced to a minimum. Since the water is not changed, and only small quantities of make up water are required, it may be softened and treated to inhibit corrosion with very little expense. The invention also provides a heater well suited to applications whereby heat which may be generated by the available fuel in excess of that required to heat the liquid material may be utilized for other purposes, such as space heating. On the other hand the system is adapted to utilize heat from other sources than the burning fuel, for example, the heat from engine cooling systems such as is often available in plants utilizing the heaters of the general type to which this invention relates.

I believe that the operation and advantages of my invention will be well appreciated from the foregoing description, and it is to be understood that, while I have shown and described several forms of my invention, other details and arrangements of parts may be resorted to without departing from the spirit and scope of my invention as defined by the claims that follow.

I claim:

1. A heater for heating liquids containing digestible organic wastes comprising a tank for confining a bath liquid, a burner, a combustion chamber extending from said burner and including a plurality of fire tube sections extending through said bath liquid for passing heated gases therethrough, and a conduit of generally serpentine form for passing material to be heated through and in heat exchange relation with said bath liquid, said conduit including a plurality of pipe sections disposed in generally parallel relation and extending through said bath liquid, and mounted in the walls of said tank, in sealing relation therewith, and one-piece return bends connecting the ends of adjacent conduit sections, said return bends at least at one end of said tank each being detachably secured in position externally of said tank, for removal while the bath liquid remains in said tank.

2. A heater for heating liquids containing digestible organic wastes comprising, a tank for containing a bath liquid, a substantially vertical partition dividing said tank into a heated compartment and a heating compartment lying entirely at one side the plane of said vertical partition from said heated compartment, means providing communication between said compartments at the top and bottom portions respectively thereof, a combustion chamber in the lower portion of said heated compartment, a series of parallel fire tubes disposed above and connected to said combustion chamber, said series of fire tubes extending close to the top of said heated compartment, a series of parallel conduit sections disposed in and extending close to the top and bottom respectively of said heating compartment, and means serially connecting said conduit sections.

3. A heater for heating liquids containing digestible organic wastes comprising, a tank for containing a bath liquid and having a partition dividing it into a heated compartment and a heating compartment, a conduit extending through said heating compartment for circulating through said bath liquid and conduit a second liquid to be heated, means for heating said bath liquid including a combustion chamber and fire tubes extending through said tank for circulating heating gases through said bath, and an external circulating system connected between said compartments and including a heat exchanger externally of said tank for utilizing any heat in the bath liquid in excess of that required to maintain the desired temperature of the second liquid passing through said conduit.

4. A heater for heating liquids containing digestible organic wastes comprising, a tank for containing a bath liquid held at a predetermined temperature, means for heating said bath, and a conduit extending through said tank for circulating through said bath liquid and conduit a second liquid to be heated containing digestible organic wastes, said conduit including a plurality of generally straight, parallel pipe sections extending in said tank between two opposite ends thereof, means connecting said sections serially at both ends to provide therewith a generally serpentine path through said bath for said second liquid, said means including unitary return bends each connecting adjacent ends of said sections, the return bends at one end of said tank, at least, each being located exteriorly of said tank and each detachable as an entity and providing access to the interiors of each of said sections from the outside of said tank, whereby said sections can be cleaned while the bath liquid is in said tank.

5. A heater for heating liquids containing digestible organic wastes comprising, a tank for containing a liquid forming a bath, a conduit means extending through a first portion of said bath for circulating therethrough, in separated relation to the bath liquid, a liquid to be heated, means for heating the bath liquid in a second portion of said bath, means connecting said bath portions for circulation of the bath liquid therebetween, and means responsive to the temperature of the bath liquid in said first portion of the bath for controlling the rate of circulation of bath liquid between said portions to maintain a predetermined temperature in said first portion, said last means including a valve in said connecting means and thermostatic means in said first portion of the bath for controlling the opening and closing of said valve in accordance with the temperature of the bath liquid in said first portion.

6. A heater for heating liquids containing digestible organic wastes comprising, a tank for containing a bath liquid, wall means dividing said bath liquid into a first portion through which a liquid to be heated is circulated and a second portion in which heat is supplied to the bath liquid, conduit means extending through said first portion for circulating therethrough, in separated relation to the bath liquid, said liquid to be heated, means for heating the bath liquid in said second portion, upper and lower passages through said wall means connecting said portions for circulation of said bath liquid therebetween, and means for controlling the rate of circulation of bath liquid between said portions to maintain a predetermined temperature in said first portion, said last means including a valve in one of said passages, a thermostatic bulb in said first portion of said bath liquid, and means connecting said bulb and valve for controlling the opening and closing of said valve in accordance with the temperature of the bath liquid in said first portion.

7. A heater for heating liquids containing digestible organic wastes comprising, a tank for containing a bath liquid, wall means dividing said tank into a first portion through which the liquid to be heated is circulated and a second portion in which heat is supplied to the bath liquid, conduit means extending through said first portion for circulating therethrough said liquid to be heated, means for heating the bath liquid in said second portion, means including a conduit connecting said bath portions and a pump for circulating said bath liquid between said portions, and means including a valve in said last-named conduit and a thermostatic element disposed in said first portion and responsive to the temperature of the bath liquid in said portion for actuating said valve to control the rate of circulation of both liquid between said portions to maintain a predetermined temperature in said first portion.

8. A heater for heating liquids containing digestible organic wastes, comprising a tank for confining a bath liquid and having separated heated and heating compartments, conduit means extending exteriorly of said tank for connecting said compartments for circulation of the bath liquid therebetween, means for controlling the rate of circulation of bath liquid, a burner, a combustion chamber and fire tubes extending from said burner and through said heated section for passing heated gases therethrough, and a conduit for passing material to be heated through said heating compartment, said conduit including a plurality of pipe sections disposed in generally parallel relation and extending through said heating compartment, and readily removable return bends disposed exteriorly of said bath liquid and tank and serially connecting the ends of adjacent said conduit sections at both ends of said tank.

9. A heater for heating liquids containing digestible organic wastes comprising a tank for containing a bath liquid, a conduit extending through said bath liquid for circulating therethrough a second liquid to be heated, means for heating said bath liquid including a substantially straight elongated combustion chamber in said bath liquid, a plurality of fire tubes extending through said tank and through opposite end walls thereof, an exhaust manifold communicating with the corresponding ends of said fire tubes exteriorly of one of said end walls, an extension of said combustion chamber communicating with said combustion chamber and the other ends of said fire tubes adjacent and exteriorly of the other of said end walls, a jacket for containing bath liquid surrounding said combustion chamber extension, and connections between said tank and the interior of said jacket for circulating the bath liquid therebetween.

10. A heater for heating liquids containing digestible organic wastes comprising, means including a tank for containing a bath liquid, means including a combustion chamber and fire tubes extending through said bath liquid for heating said bath liquid, and a conduit extending through said bath liquid for circulating through said bath liquid a second liquid to be heated, and including a plurality of parallel tubes extending in said bath liquid and mounted in and extending through the end walls of said tank and a plurality of internally unobstructed, unitary return bends serially connecting said tubes, said return bends at least at one end of said tank each being detachably secured in position externally of said bath liquid and tank and each removable as a unit.

11. A heater for heating liquids containing digestible organic wastes comprising, a tank for containing a bath liquid, a conduit extending through said tank for circulating through a first zone of said bath liquid a second liquid to be heated including a plurality of pipe sections in said bath liquid and return bends connecting the ends of said pipe sections, the return bends at one end of said tank being located externally of the tank and readily removable, means for heating said bath liquid including a combustion chamber disposed in a second, separate and distinct zone of said bath liquid, a fire tube manifold leading from said combustion chamber, a water jacket around at least a portion of said combustion chamber, and means for circulating bath liquid between said zones including a first conduit extending from said second zone to said first zone and externally of said tank, and a second conduit extending from said first zone and internally of said bath liquid to said water jacket.

12. A heater for heating liquids containing digestible organic wastes comprising, a closed tank for containing a bath liquid, means for heating said bath liquid, and a conduit extending through said tank for circulating through said bath liquid a second liquid to be heated, said conduit including a plurality of straight, substantially parallel pipe sections extending in said tank and secured to the end walls thereof, and unitary, generally semi-toric return bends connecting the ends of adjacent of said sections, with the return bends at least at one end of said tank disposed exteriorly of said tank and detachable each as a single unit, thereby providing ready access to the interior of said conduit whereby the latter can be cleaned while in position in said tank and while said bath liquid is in said tank.

13. A heater for heating liquids containing digestible organic wastes comprising, a tank for containing a bath liquid, a substantially vertical partition dividing said tank into a heated compartment and a heating compartment at one side of said heated compartment, openings adjacent the top and bottom of said partition respectively providing communication between said compartments, a combustion chamber and fire tubes extending in said heated compartment, a conduit extending in said heating compartment for passing a second liquid to be heated therethrough, and manually operable valve means in one of said openings for adjustably controlling the flow of liquid therethrough and thereby the circulation of bath liquid between said compartments.

14. A heater for heating liquids containing digestible organic wastes comprising, means for confining a bath liquid and defining separate first and second tank portions, said means including spaced parallel end walls and side walls extending between said end walls, a plurality of conduit sections disposed in the first of said tank portions for passing therethrough liquids to be heated and extending in parallel relation between and mounted in said end walls, a plurality of one-piece return bends connecting the ends of adjacent conduit sections and detachably secured to the corresponding end wall, means for heating said bath liquid including a burner, means for passing heated gases in heat exchange relation with said bath liquid in the second of said tank portions removed from said conduit sections, and means for circulating heated bath liquid between said bath portions.

15. A heater for heating liquids containing digestible organic wastes comprising, a tank for containing a bath liquid, wall means dividing said tank into a first portion through which the liquid to be heated is circulated and a second portion in which heat is supplied to the bath liquid, conduit means extending through said first portion for circulating therethrough said liquid to be heated, means for heating the bath liquid in said second portion, means including a conduit connecting said bath portions and a pump for circulating said bath liquid between said portions, means including a valve in said last-named conduit and a thermostatic element disposed in said first portion and responsive to the temperature of the bath liquid in said portion for actuating said valve to control the rate of circulation of bath liquid between said portions to maintain a predetermined temperature in said first portion, a second means connecting said portions for circulation of bath liquid therebetween, and a manually operable valve in said connecting means for controlling the circulation of bath liquid therethrough.

HARRY E. SCHLENZ.

REFERENCES CITED

The following references are of record in the file of this patent:

UNITED STATES PATENTS

| Number | Name | Date |
|---|---|---|
| 337,506 | Lagosse | Mar. 9, 1886 |
| 498,239 | Coignet | May 30, 1893 |
| 1,751,533 | Taylor | Mar. 25, 1930 |
| 1,768,992 | Martin | July 1, 1930 |
| 1,838,266 | Kreager | Dec. 29, 1931 |
| 1,940,973 | Sharp | Dec. 26, 1933 |
| 1,980,424 | Morgan | Nov. 13, 1934 |
| 2,055,949 | Sharp | Sept. 29, 1936 |
| 2,070,182 | Saathoff | Feb. 9, 1937 |
| 2,073,825 | Beck et al. | Mar. 16, 1937 |
| 2,135,275 | Cannon | Nov. 1, 1938 |
| 2,268,871 | Hall | Jan. 6, 1942 |
| 2,330,191 | Beckett | Sept. 28, 1943 |
| 2,353,201 | Talbot | July 11, 1944 |
| 2,354,932 | Walker et al. | Aug. 1, 1944 |
| 2,455,988 | Fife | Dec. 14, 1948 |
| 2,475,604 | Frisch et al. | July 12, 1949 |